(12) United States Patent
Gunnarsson et al.

(10) Patent No.: US 10,952,274 B2
(45) Date of Patent: Mar. 16, 2021

(54) METHOD, SYSTEM AND DEVICES FOR CONNECTING A USER EQUIPMENT, UE, TO A TELECOMMUNICATION NETWORK

(71) Applicant: Telefonaktiebolaget LM Ericsson (publ), Stockholm (SE)

(72) Inventors: Fredrik Gunnarsson, Linköping (SE); Diana Andrei, Linköping (SE); Samuel Axelsson, Linköping (SE); Olof Axel Granberg, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 114 days.

(21) Appl. No.: 16/527,510

(22) Filed: Jul. 31, 2019

(65) Prior Publication Data

US 2019/0357293 A1    Nov. 21, 2019

Related U.S. Application Data

(63) Continuation of application No. 15/570,763, filed as application No. PCT/EP2015/061996 on May 29, 2015, now Pat. No. 10,420,162.

(51) Int. Cl.
*H04W 76/19*        (2018.01)
*H04W 48/20*        (2009.01)
(Continued)

(52) U.S. Cl.
CPC ........... *H04W 76/19* (2018.02); *H04W 48/20* (2013.01); *H04W 76/11* (2018.02); *H04W 76/15* (2018.02); *H04W 92/12* (2013.01)

(58) Field of Classification Search
None
See application file for complete search history.

(56) References Cited

U.S. PATENT DOCUMENTS 8,583,085 B2    11/2013  Kobayashi et al.
9,713,044 B2 *   7/2017  Yamada ............ H04W 36/0072
(Continued)

FOREIGN PATENT DOCUMENTS

EP       1928126 A2    6/2008
WO    2005002261 A1    1/2005
(Continued)

OTHER PUBLICATIONS

"Combination of Solutions for Retrievable Configurations", 3GPP TSG RAN WG2 #90, R2-152111, Fukuoka, Japan, May 25-29, 2015, pp. 1-2.
(Continued)

*Primary Examiner* — Brian S Roberts
(74) *Attorney, Agent, or Firm* — Murphy, Bilak & Homiller, PLLC

(57)    ABSTRACT

Method or connecting a User Equipment, UE, to a telecommunication network via an access node comprised in said network, said method comprising the steps of receiving, by said access node, a connection request from said UE, retrieving, by said access node, connection configuration parameters for said UE related to a prior connection between any UE and said telecommunication network, determining, based on a time value associated to said connection configuration parameters related to said prior connection, that said connection configuration parameters related to said prior connection can be re-used, connecting, by said access node, said UE to said telecommunication network via said access node by setting up said connection configuration parameters related to said prior connection, for said UE.

22 Claims, 11 Drawing Sheets

(51) Int. Cl.
H04W 92/12 (2009.01)
H04W 76/15 (2018.01)
H04W 76/11 (2018.01)

(56) References Cited

U.S. PATENT DOCUMENTS

| | | | |
|---|---|---|---|
| 2013/0016658 A1* | 1/2013 | Lovsen | H04W 76/19 |
| | | | 370/328 |
| 2013/0260740 A1 | 10/2013 | Rayavarapu | |
| 2013/0260810 A1 | 10/2013 | Rayavarapu | |
| 2014/0022990 A1* | 1/2014 | Guo | H04W 76/27 |
| | | | 370/328 |
| 2014/0177592 A1 | 6/2014 | Li et al. | |
| 2014/0219248 A1 | 8/2014 | Reddiboyana et al. | |

FOREIGN PATENT DOCUMENTS

| | | |
|---|---|---|
| WO | 2013007313 A1 | 1/2013 |
| WO | 2014187468 A1 | 11/2014 |
| WO | 2016128041 A1 | 8/2016 |
| WO | 2016128059 A1 | 8/2016 |

OTHER PUBLICATIONS

"Re-usable Configurations in RRC Signaling", Ericsson, 3GPP TSG RAN WG2 #88, R2-144891, San Francisco, US, Nov. 17-21, 2014, pp. 1-3.

* cited by examiner

METHOD, SYSTEM AND DEVICES FOR CONNECTING A USER EQUIPMENT, UE, TO A TELECOMMUNICATION NETWORK

CROSS-REFERENCE TO RELATED APPLICATONS

The present application is a continuation of U.S. application Ser. No. 15/570,763 filed 31 Oct. 2017, which is a U.S. national stage of International Appl. PCT/EP2015/061996 filed 29 May 2015, the entirety of which is incorporated herein by reference for all purposes.

TECHNICAL FIELD

The present invention generally relates to a method of connecting a User Equipment, UE, to a telecommunication network via an access node comprised by the network.

BACKGROUND

In case a wireless User Equipment, UE, intends to connect to a telecommunication network, it will send a connection request message to an access node comprised by the network. This access node is a Radio Base Station, RBS, also known as eNodeB, depending on the technology applied. Upon receipt of such a connection request message, connection configuration parameters are determined by a connection management function for determining specific settings for the (wireless) connection between the UE and the access node.

Such connection configuration parameters relate to a variety of settings, although they all relate to the physical or logical connection between the UE and the telecommunication network, or more precise between the UE and the access node. Here below, examples of such connection configuration parameters and a short summary of the content of these parameters are provided.

In order to increase capacity in the telecommunication network, an operator typically decides to deploy cells on multiple frequency layers, referred to as carriers. Load balancing is a known technique to balance the traffic load between overlaid cells in the network in order to utilize the capacity on the different frequency layers. Connection configuration parameters may therefore comprise load balancing parameters for, for example, indicating the load in each cell, or which cells are overlaid, etc.

Another example of connection configuration parameters relates to carrier aggregation. A UE shall be arranged for transmitting and/or receiving data via more than one frequency layer or carrier from the same or a different access node. In case a UE is capable of supporting such functionality, multiple carriers may be aggregated such that the UE is provided with wider transmission bandwidths.

Dual Connectivity is another example of a connection configuration parameter. It enables the establishment of user plane connections via another access node, referred to as a secondary access node, while maintaining higher layer connection management via a master access node. This means that a UE shall have user plane connections completely via the master or primary access node, or split between the master access node and the secondary access node.

A further example of a connection configuration parameter is related to unlicensed carrier operation. In case unlicensed carrier operation is applicable, some criteria have to be met in order to co-exist with other (licensed or unlicensed) connections in the same frequency bands. The connection configuration parameters may then be related to these criteria.

An example of deployment of radio base station antennas is via flexible multi-element antennas. These antenna elements are configured to combine in such a way that the transmitted energy, or receiver sensitivity, becomes directional, i.e. like a beam. The configuration parameters of these multiple-element antennas for creating such a directional beam may be comprised by the connection configuration parameters.

Based on the above, it is clear that complex configurations, i.e. connection configuration parameters, need to be determined by the connection management function once a connection request message from the UE has been received by the access node. Determining these connection configuration parameters may further involve signalling further nodes, for example core telecommunication network nodes, for obtaining connection information to be used for determining the actual connection configuration parameters.

The process of determining these complex configurations is considered to be time consuming and thus reduce user performance and experience, to take up many resources, i.e. increases the load of the telecommunication network, and to be relatively imprecise.

SUMMARY

It is an object of the present invention to provide for an improved method of connecting a User Equipment, UE, to a telecommunication network via an access node comprised in the network, such that the process of determining the connection configuration parameters is made more efficient.

It is another object to provide for an access node arranged for connecting a UE to a telecommunication network, wherein the access node is arranged for efficiently determining and setting the connection configuration parameters for the UE.

It is a further object to provide for an improved UE arranged for requesting reconnection to a telecommunication network via an access node comprised in the network, in such a way that the connection configuration parameters for the UE are efficiently determined.

It is a further object to provide for an improved control node arranged for efficiently determining and providing configuration parameters for a connection between the UE and the telecommunication network.

In a first aspect of the invention there is provided a method of connecting a User Equipment, UE, to a telecommunication network via an access node comprised in said network, said method comprising the steps of:
- receiving, by said access node, a connection request from said UE;
- retrieving, by said access node, connection configuration parameters for said UE related to a prior connection between said UE and said telecommunication network;
- determining, based on a time value associated to said connection configuration parameters related to said prior connection, that said connection configuration parameters related to said prior connection can be re-used;
- connecting, by said access node, said UE to said telecommunication network via said access node by setting up said connection configuration parameters related to said prior connection, for said UE.

The method is based on the insight that connection configuration parameters for the UE related to a prior connection between any UE and the telecommunication network are already be available such that these parameters can be re-used for the UE. More specifically, it is based on the insight that the likelihood that the connection configuration parameters are to be re-used depends on a time value associated to the connection configuration parameters related to the prior connection.

In case connection configuration parameters related to a prior connection are already known in the telecommunication network, and in case it is determined, based on the time value, that these connection configuration parameters may be re-used, it is no longer needed for the access node to determine the complex configuration, i.e. the connection configuration parameters, for the UE, as the parameters are to be re-used. The process of determining the connection configuration parameters is therefore made very simple, as the connection configuration parameters are already known from a prior connection between the UE and the telecommunication network. The method thus takes up fewer resources, i.e. it decreases the load of the telecommunication network compared to the conventional method for determining these connection configuration parameters.

In an example, the present invention is directed to the insight that available configuration parameters which are relatively fresh, or recent, are to be re-used for the same UE as it is likely that these configuration parameters are still valid for that UE. As such, the applicability and relevance of the connection configuration parameters from the prior connection is evaluated in consideration of the time value related to the prior connection.

The access node preferably retrieves connection configuration parameters for the UE related to a prior connection between said same UE and the telecommunication network. However, it may also be feasible that available connection configuration parameters between a different UE and the telecommunication network shall be re-used for the UE, for the same reasoning.

In the context of the present invention, the access node are any of an "evolved nodeB", "eNB", "eNodeB, "NodeB", "B node", or Base Transceiver Station, BTS, depending on the technology and terminology used.

By re-using known connection configuration parameters for the UE, the initial UE configuration can be made UE specific which means that a UE specific configuration is adopted much faster compared to using a general purpose initial configuration. Furthermore, measurement configurations and feedback is tailored to the initial UE specific situation which enables more efficient resource utilization.

According to the present invention, not all available connection configuration parameters need to be re-used for a particular UE. In order to obtain the advantages of the method, it is sufficient when at least one available connection configuration parameter is re-used, or when the connection configuration parameters for the UE are determined using the available connection configuration parameters as an input for the determination process. In the latter, using the available connection configuration parameters in the determination process ensure that the determination process quickly converges to a UE specific configuration.

Typically, the connection configuration parameters are directed to the settings of the specific physical or logical wireless connection between the UE and the access node to which it connects.

The available connection configuration parameters are directed to a prior connection between the UE and the telecommunication network, i.e. they may be directed to the connection of the UE to the same access node, but can also be directed to the connection of the UE to a different access node comprised in the same telecommunication network.

According to the present invention, the telecommunication network is typically any of a Long Term Evolution, LTE, network, an Evolved Packets System, EPS, network, a Universal Mobile Telecommunications System, UMTS, network and a General Packet Radio Service, GPRS, network.

One of the advantages of the present invention is that by associating the connection configuration parameters to a time value, it is possible to determine whether available connection configuration parameters related to a prior connection are relevant, or to what extent the connection configuration parameters shall be considered for the UE requesting a connection. Thereby, the prior connection configuration parameters will be considered in an adequate manner without risking to exploit outdated connection configuration parameters.

In an example, the time value indicates any of:
time that has passed since said prior connection between said UE and said telecommunication network, and
session time length of said prior connection between said UE and said telecommunication network, and
average session time length of prior connections between said UE and said telecommunication network.

In case the time value indicates the time that has passed since said prior connection between said UE and said telecommunication network, then the prior connection may have been time stamped or the like, for example upon connection release. The time difference between the receipt of the connection request from the UE and the time stamp of the prior connection are then be used for determining whether the available connection configuration parameters are to be re-used for the UE.

It was a further insight that also the session time length of the prior connection between the UE and the telecommunication network as well as the average session time length of prior connection between the UE and the telecommunication network shall impact the usability of at least some of the available connection configuration parameters for the UE.

In an example, the step of determining that said connection configuration parameters related to said prior connection can be re-used comprises:
determining that said time value associated to said configuration parameters related to said prior connection is below a pre-determined time value threshold for determining that said configuration parameters related to said prior connection can be re-used.

The time value threshold may be maintained, set and provided by any network node in the telecommunication network, for example a Mobility Management Entity, MME, or a Home Subscriber Server, HSS, or the like. This ensures that each of the access nodes are provided with a same time value threshold enabling uniformity between the access nodes in a telecommunication network. Alternatively, each of the access nodes are responsible themselves for setting the time value threshold.

The time value threshold may be a static constant which is set once to a pre-determined value. If the user is assumed mobile, or the connection configuration parameters are considered volatile, then the time value may be in the order of minutes or tens of minutes. However, the time value threshold may also be a variable which may be amended as time passes by. For example, in case a network node detects that re-used connection configuration parameters for UE's are often not considered valid, then the network node recognizes that the time value threshold is set too high. As such, the time value threshold is lowered as to ensure that re-used connection configuration parameters for UE's are more often used validly.

In another example, said step of determining that said connection configuration parameters related to said prior connection can be re-used is performed by any of:

said access node, and a control node comprised in said telecommunication network.

In a further example, said connection configuration parameters for said UE related to said prior connection between said UE and said telecommunication network are stored in said access node and are further associated to a device identifier of said UE, wherein said step of determining that said configuration parameters related to said prior connection can be re-used comprises:

receiving, by said access node, from a control node in said telecommunication network, said device identifier of said UE, and retrieving, by said access node, said time value associated to said connection configuration parameters related to said prior connection using said received device identifier.

In modern telecommunication network, the true identity of the UE is hidden from the access node. This poses a problem to the access node, as it shall not relate a new connection request from a particular UE to a prior connection of that same UE. As such, the access node is also not able to determine the time value associated with the prior connection.

The above state problem is solved by the present example of the application in that a control node provides the access node with a device identifier of the UE, such that the access node is able to determine the prior connection of that UE with the telecommunication network. A control node, for example a core network node of the telecommunication network, is entitled to be aware of the true identity of the UE. As such, it may create, provide, or associate each UE with a particular device identifier merely for the reason that the access node is able to determine a prior connection for each UE. Using this example, the true identity of the UE is still kept hidden from the access node and the access node enable to relate UEs to prior connections. The same reasoning as above is valid for time values related to the prior connections.

In another example, the method further comprises the step of:

upon detection of a released connection between said UE and said telecommunication network via said access node, storing said connection configuration parameters and said associated time value such that said connection configuration parameters are available, for re-use, when said access node receives a further connection request from said UE or from any UE in a same geographical area.

The advantage of this example is that it is ensured that the connection configuration parameters are made available for the UE in case the UE intends to reconnect to the telecommunication network, for example via the same access node. This will make sure that the latest, and thus also promising, connection configuration parameters are available for the UE during reconnection to the telecommunication network. The associated time value is stored as well, enabling the step of determining, based on a time value The key concept of this example is that connection configuration parameter for a UE are stored once the UE moves from a connected mode to an idle mode, i.e. when the UE is released from the telecommunication network. As such, the connection configuration parameters are saved between sessions of the same UE to the same telecommunication network.

In order to detect a released connection, the telecommunication network, or the access node, monitors the UE data buffers. In case the UE data buffers are empty for a certain time period, the UE is actively released from the telecommunication network by, for example, signalling messages to the UE.

Another possibility of detecting a released connection is detecting that the connection is suddenly lost, for example during an error case or the like. The telecommunication network, or more specifically the access node, is able to detect such a situation as the UE is no longer responding to any messages sent to that UE. In such a situation, the access node may consider that the connection between the UE and the access node is lost, and will then store the connection configuration parameters related to the last known configuration for that LIE.

In a more detailed example hereof, the step of storing comprises at least one of:

storing, by said UE, said connection configuration parameters and/or said associated time value;

storing, by said access node, said connection configuration parameters and/or said associated time value;

forwarding, by said access node, said connection configuration parameters to, and storing said connection configuration and/or said associated time value by a control function residing in, a control node comprised in said telecommunication network.

In case the connection configuration parameters and the associated time value are stored by the UE, as disclosed above, then the detection of the released connection between the UE and the telecommunication network may also be performed by the UE. Next time the UE intends to reconnect to the same telecommunication network, it will send a connection request message to any of the access nodes comprised in the telecommunication network but it will also provide the telecommunication network, for example the access node, with its stored connection configuration parameters and the associated time value such that these parameters are made available in the telecommunication network.

Based on the time value, the access node, for example, decides to re-use the connection configuration parameters for that UE. The time value is, for example, in the order of minutes or tens of minutes. If the time between subsequent connections by the same UE to the telecommunication network is less than the time value, the connection configuration parameters may be re-used.

The connection configuration parameters and the associated time value may also be stored in a memory of the access node, or in the memory of any control node comprised in the telecommunication network. In the latter, the access node, or the UE, needs to signal the connection configuration parameters and the time value to the control node, and it thus also needs to request the control node for available connection configuration parameters and/or the associated time value in case a UE intends to connect to the telecommunication network.

According to the present invention, the connection configuration parameters, in an example thereof, comprises any of:

frequency carrier aggregation configuration via licensed and unlicensed frequency bands:

dual connectivity configuration;

antenna beam configuration;

uplink timing configuration;

history of need for and utilization of secondary carriers;
geographical information
aggregated frequency bands;
aggregated bandwidth, and
measurement and feedback configuration.

Frequency carrier aggregation configuration via licensed and unlicensed bands entail that a carrier in licensed band that was configured as secondary carrier in the available connection configuration parameters is set in the same way in the new session, i.e. the connection between the UE and the access node. This may also depend on the load situation at different carriers, such that none, some or all of the previously configured carriers are configured for the current session. The same is valid for carriers in unlicensed bands.

Dual connectivity configuration within the same or across radio access technologies entail that a secondary access node at the same radio access technology that was configured as a secondary access node in the available connection configuration parameters is configured in the same way in the new session. This also depends on the load situation at different carriers at the secondary access node, so none, some or all of the previously configured secondary base stations are configured for the new session.

Antenna beam configurations entail that an antenna element configuration in the available connection configuration parameters is configured in the same way for the new connection between the UE and the telecommunication network.

History of need for and utilization of secondary carriers comprise which fraction of time the additional configurations have been used, fraction of resources used at the primary configuration and resources used at the additional configurations, what performance were observed for the additional configuration and the need to change connection configuration during previous connections.

The history of need for and utilization of secondary carriers are, for example, used to decide when it's better to use an initial configuration, i.e. an initial set of connection configuration parameters, instead of using the yet available connection configuration parameters related to a prior connection between the UE and the telecommunication network, as the initial configuration. For example, if it is clear that the available connection configuration parameters did not lead to satisfactory performance results for the UE, it may he decided to use an initial set of connection configuration parameters instead.

The geographical information may comprise cell identity, tracking area identity, Global Navigation Satellite System, GNSS, measurements, estimated angle from the access node to the UE, estimated range from the access node to the UE and an estimated fingerprint, which basically is a set of measurements from serving and non-serving cells, comprising signal strength measurements, range measurements, etc.

According to the present invention, the telecommunication network may comprise any of an Evolved Packets System, EPS, network, a Universal Mobile Telecommunications System, UMTS, network, a General Packet Radio Service, GPRS, network, a Global System for Mobile Communications, GSM, network and a Long Term Evolution, LTE, network.

According to the present invention, the access node is typically any of a radio base station and an eNodeB, or a node having a control function which provides functionality of any of a Mobility Management Entity, MME, and an Access Network Discovery and Selection Function Server, ANDSF-server.

In a second aspect of the invention, there is provided an access node arranged for connecting user equipment, UE, to a telecommunication network, said telecommunication network comprising said access node, said access node comprising:

receive equipment arranged for receiving a connection request from a User Equipment, UE;

retrieve equipment arranged for retrieving connection configuration parameters for said UE related to a prior connection between said UE and said telecommunication network;

determine equipment arranged for determining, based on a time value associated to said configuration parameters related to said prior connection, that said configuration parameters related to said prior connection can be re-used.

connect equipment arranged for connecting said UE to said telecommunication network by setting up said connection configuration parameters related to said prior connection.

In accordance with the present invention, the receive equipment of the access node is, in an example, further arranged to time stamp the incoming connection request by said UE with a time value, for enabling the possibility for determining the time between two subsequent connection requests. The time value may, for example, be considered as metadata accompanying the received connection request.

The access node typically comprises a processor and a memory, wherein the memory comprising instructions executable by the process, whereby the location server is operative to perform any of the method steps directed to the access node, as disclosed with the examples provided above.

In the context of the present invention, a module, device, equipment, or the like can also be implemented as a computer program running on the processor.

In an example, the determine equipment is further arranged for determining that said time value associated to said configuration parameters related to said prior connection is below a pre-determined time value threshold for determining that said configuration parameters related to said prior connection can be re-used.

The expressions, i.e. the wording, of the different aspects comprised by the access node according to the present invention should not be taken literally. The wording of the aspects is merely chosen to accurately express the rationale behind the actual function of the aspects.

In accordance with the present invention, different aspects applicable to the above mentioned examples of the method, including the advantages thereof, correspond to the aspects which are applicable to the access node and/or the control node according to the present invention.

In a third aspect of the invention, there is provided a control node arranged for providing configuration parameters for a connection between a User Equipment, UE, and a telecommunication network via an access node comprised in said network, said control node comprising:

receive equipment arranged for receiving, from said access node, a request for configuration parameters for said UE;

retrieve equipment arranged for retrieving connection configuration parameters for said UE related to a prior connection between said UE and said telecommunication network;

determine equipment arranged for determining, based on a time value associated to said configuration parameters related to said prior connection, that said configuration parameters related to said prior connection can be re-used;

provide equipment arranged for providing said configuration parameters related to said prior connection to said access node.

In an example hereof, the determine equipment is further arranged for determining that said time value associated to said configuration parameters related to said prior connection is below a pre-determined time value threshold for determining that said configuration parameters related to said prior connection are to be re-used.

In a fourth aspect of the invention, there is provided a User Equipment, UE, arranged for requesting a connection to a telecommunication network via an access node comprised in said network, said UE comprising:

retrieve equipment arranged for retrieving connection configuration parameters for said UE related to a prior connection between said UE and said telecommunication network:

determine equipment arranged for determining, based on a time value associated to said connection configuration parameters related to said prior connection, that said connection configuration parameters related to said prior connection can be re-used;

process equipment arranged for setting up said configuration parameters related to said prior connection, for said UE;

request equipment arranged for requesting said connection to said telecommunication via said access node using said set-up configuration parameters.

In a fifth aspect of the invention, there is provided a non-transitory computer-readable storage medium, comprising instruction which, when executed on at least one processor, cause the at least one processor to carry out the method according to any of the examples provided above.

In a sixth aspect of the invention, there is provided a telecommunication network arranged for connecting a User Equipment, UE, to an access node comprised in said network, wherein said access node comprises:

receive equipment arranged for receiving a connection request from a User Equipment, UE;

retrieve equipment arranged for retrieving connection configuration parameters for said UE related to a prior connection between said UE and said telecommunication network;

determine equipment arranged for determining, based on a time value associated to said configuration parameters related to said prior connection, that said configuration parameters related to said prior connection are to be re-used.

connect equipment arranged for connecting said UE to said telecommunication network by setting up said connection configuration parameters related to said prior connection.

In a seventh aspect of the invention, there is provided an access node arranged for connecting user equipment, UE, to a telecommunication network, said telecommunication network comprising said access node, said access node comprising:

receive module for receiving a connection request from a User Equipment, UE.

retrieve module for retrieving connection configuration parameters for said UE related to a prior connection between said UE and said telecommunication network;

determine module for determining, based on a time value associated to said configuration parameters related to said prior connection, that said configuration parameters related to said prior connection are to be be re-used;

connect module for connecting said UE to said telecommunication network by setting up said connection configuration parameters related to said prior connection.

In an eight aspect of the invention, there is provided a control node arranged for providing configuration parameters for a connection between a User Equipment, UE, and a telecommunication network via an access node comprised in said network, said control node comprising:

receive module for receiving, from said access node, a request for configuration parameters for said UE;

retrieve module for retrieving connection configuration parameters for said UE related to a prior connection between said UE and said telecommunication network;

determine module for determining, based on a time value associated to said configuration parameters related to said prior connection, that said configuration parameters related to said prior connection are to be re-used;

provide module for providing said configuration parameters related to said prior connection to said access node.

In a ninth aspect of the invention, there is provided a User Equipment, UE, arranged for requesting a connection to a telecommunication network via an access node comprised in said network, said UE comprising:

retrieve module for retrieving connection configuration parameters for said UE related to a prior connection between said UE and said telecommunication network:

determine module for determining, based on a time value associated to said connection configuration parameters related to said prior connection, that said connection configuration parameters related to said prior connection are to be re-used;

process module for setting up said configuration parameters related to said prior connection, for said UE;

request module for requesting said connection to said telecommunication via said access node using said set-up configuration parameters.

The above-mentioned and other features and advantages of the invention will be best understood from the following description referring to the attached drawings. In the drawings, like reference numerals denote identical parts or parts performing an identical or comparable function or operation

DETAILED DESCRIPTION

Figure 1:
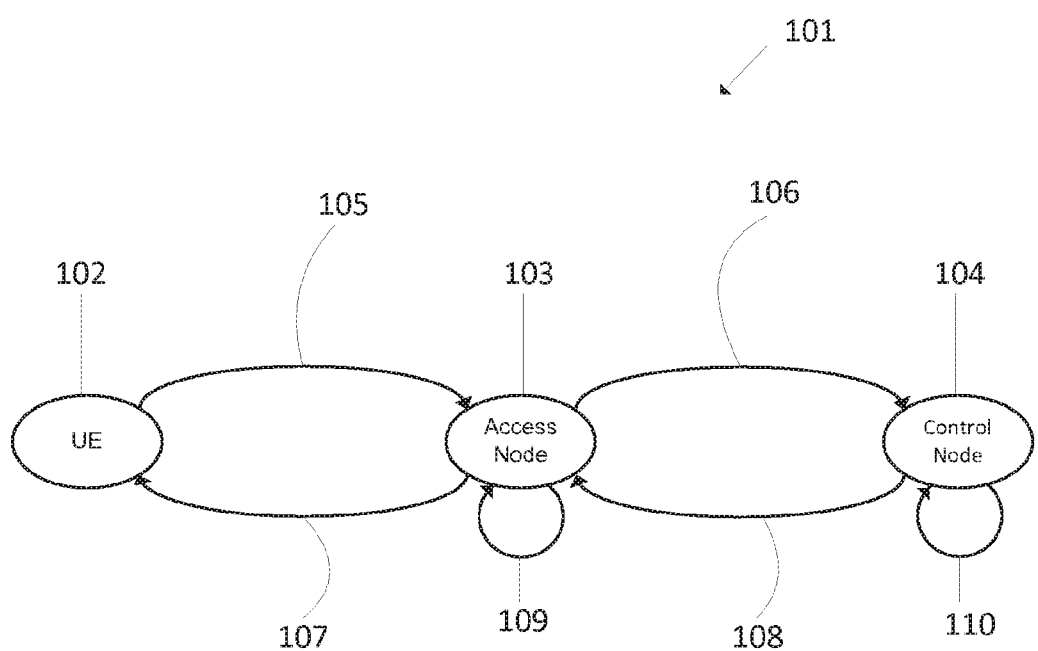
FIG. 1 is a schematic diagram illustrating an embodiment of the method steps.

FIG. 1 is a schematic diagram 101 illustrating an embodiment of the method steps. Here, a User Equipment, UE 102, intends to connect to a telecommunication network comprising at least an access node 103. The network further comprises a control node 104.

The UE 102 transmits 105 a connection request message towards the access node 103 comprised in the telecommunication network. The access node 103 is typically any of a Radio Base Station, RBS or an eNodeB, eNB, depending on technology implemented, or may comprise a control function providing functionality of a mobility management entity, or an access network discovery and selection function server. Upon receipt of the connection request message, the access node 103 needs to determine whether the UE 102 is allowed to gain access to the telecommunication network, and, if so, needs to determine and set connection configuration parameters for the UE 102.

These connection configuration parameters relate to the wireless connection between the UE 102 and the access node 103, for example Physical layer parameters, Medium Access Layer, MAC, parameters or the like.

In order to determine these connection configuration parameters for the UE 102, the access node 103 informs 106 or requests a control function, located in e.g. the control node 104 whether connection configuration parameters related to a prior connection between that specific UE 102 and the same telecommunication network are still available for re-use. These connection configuration parameters have been stored previously, by the control node 104, once it had been detected that the prior connection between the UE 102 and the telecommunication network had been released.

The detection that the prior connection between the UE 102 and the telecommunication network had been released may also function as a trigger for setting and storing a time value by the access node 103, for example in the form a time stamp, related to the connection configuration parameters set during that specific prior connection. This enables the access node 102 and/or the control node 104 to relate a new connection request from that particular UE 102.

The access node 103 provides the control node 104 with the International Mobile Subscriber Identity, IMSI, of the UE, or any other unique identifier for uniquely identifying the UE 102. Based on the provided identifier, the control node 104 is able to uniquely retrieve the associated connection configuration parameters for that UE 102 as well as the associated time value for these connection configuration parameters, for example, from a database comprised in an internal memory of the control node 104.

Based on the associated time value, the control node 104 determines 110 that the connection configuration parameters can be re-used for that UE 102. As such, the retrieved connection configuration parameters are then transmitted 108 to the access node 103.

The access node 103 will then, subsequently, determine and set 109 the connection configuration parameters for the UE 102 based on the received available connection configuration parameter from the control node 104, and based on auxiliary information.

The auxiliary information may be directed to the accuracy, validity of the available connection configuration parameters for re-use, i.e. determined by the control node 104, and comprises performance parameters achieved by said connection configuration parameters related to said prior connection between said UE and said telecommunication network, load situation at different carriers, and present geographical information of said UE and geographical information of said UE during said prior connection between said UE and said telecommunication network.

The above discloses an example in which the control node determines 110 the applicability of the available connection configuration parameters for the UE 102. This determination process can also be performed by the access node 103, the UE 102 or any other node in the telecommunication network. A key aspect hereof is that the node performing the determination step needs to be provided with at least the time value associated with the available connection configuration parameters. The time value is an input to determine the applicability of the connection configuration parameters.

Finally, the access node 103 transmits 107 a connection accept message to the UE 102, possibly comprising at least a subset of the available connection configuration parameters for re-use, such that the UE 102 is able to set its device accordingly.

Figure 2:
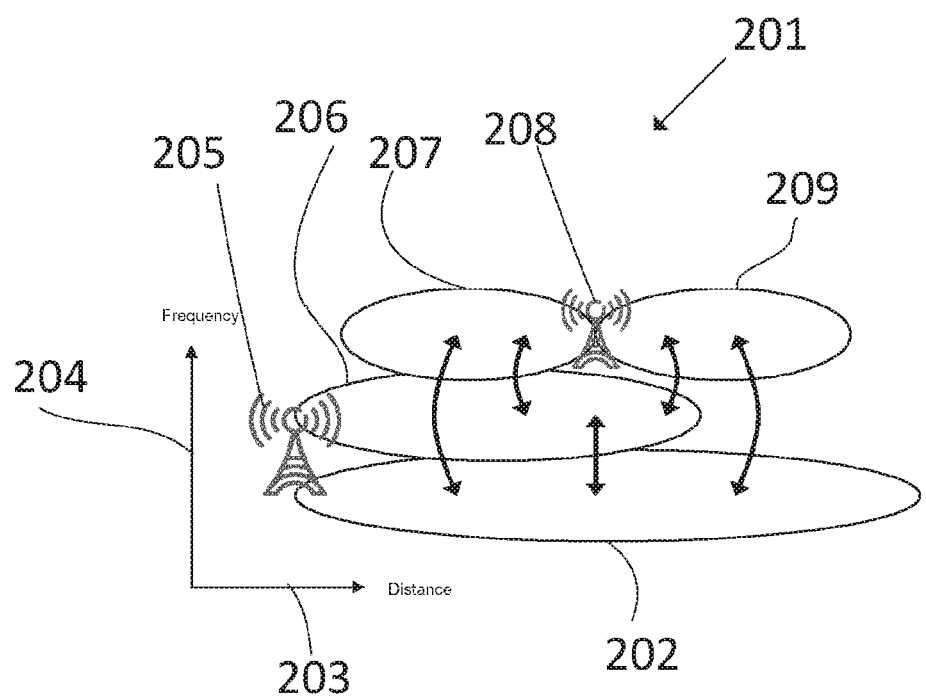
FIG. 2 is a schematic diagram illustrating an embodiment of the network.

FIG. 2 is a schematic diagram 201 of radio base stations having overlapping cells 202, 206, 207, 209, wherein each cell is operative in a different frequency band/frequency layer. The vertical axis 204 indicates the frequency of the cells, and the horizontal axis 203 indicates the available distance of the different cells.

Here, each access node 205, 208, for example an evolved UMTS Terrestrial Radio Access Network, E-UTRAN, eNodeB in an Long Term Evolution, LTE, telecommunication network, serves cells 202, 206, 207, 209, which may or may not overlap with each other. In the present example, the access nodes shown in FIG. 2, i.e. access nodes having reference numeral 205 and 208, respectively, are embodiments or specific implementations of the access node shown in FIG. 1 indicated with reference numeral 103.

Load balancing, being one of the connection configuration parameters for the UE 102, is a technique to balance the traffic load between the overlapping cells 202, 206, 207, 209 in the telecommunication network in order to utilize the capacity on the different frequency layers. Potential opportunities for load balancing are illustrated with arrows between the respective different overlapping cells 202, 206, 207, 209. As such, cells which at least partly overlap with each other, for example the cells indicated with reference numerals 206 and 207, are, for example, used for load balancing.

In order to perform load balancing, each access node 205, 208 assesses the traffic load in its cells 202, 206, 207, 209. The traffic load information is then exchanged between the cells, after which a load balancing algorithm identifies whether there is a need to handover UE's between the cells 202, 206, 207, 209 in order to balance the traffic load of each of the cells 202, 206, 207, 209. In case there is a need to handover UE's in order to balance the traffic load, the UE's are selected and ordered to a different cell in a known way.

Load balancing is thus a technique which the access nodes 205, 208, for example eNodeB's, use to balance the traffic load in its cells 202, 206, 207, 209. A UE, requesting a particular service, can be ordered to a different cell, by any of the access nodes 202, 206, 207, 209, in case that different cell is also capable of providing that particular service to the UE. The different cells are provided by the same access node, or by another access node, as long as the UE is covered by that different cell.

Figure 3:
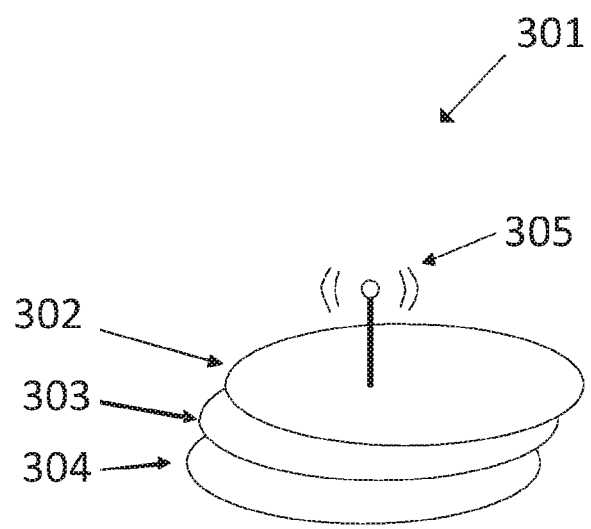
FIG. 3 is a schematic diagram illustrating an embodiment of the network.

FIG. 3 is a schematic diagram 301 of cells 302, 303, 304 having approximately the same coverage area but deploying different frequencies. As mentioned before, a UE shall be arranged to transmit and/or receive data via more than one frequency layer from the same access node 305.

In the present example, the access node shown in FIG. 3, i.e. access node having reference numeral 305 is an embodiment or a specific implementation of the access node shown in FIG. 1 indicated with reference numeral 103.

It is possible to deploy several cells 302, 303, 304 with approximately the same coverage area in case multiple frequency layers are available to the access node 305. Each of the multiple frequency layers are, in the art, referenced to as Component Carriers, CC.

Carrier Aggregation, CA, being information comprised by the connection configuration parameters, two or more of such Component Carriers are aggregated in order to support accumulated transmission bandwidths for the UE. The UE then simultaneously receives or transmits on one or multiple Component Carriers depending on the capability of the UE.

It is, for example, possible to configure a UE to aggregate a different number of Component Carriers originating from the same access node 305 and of possibly different bandwidths in the uplink and the downlink. The number of download and upload component carriers than shall be configured depends on the download and upload aggregation capabilities of the UE and of the telecommunication network.

UE's capable of handling component carriers indicate their capability to the access node 305 via Radio Resource Control, RRC, signalling, for example using a RRCConnectionReconfiguration message.

Figure 4:
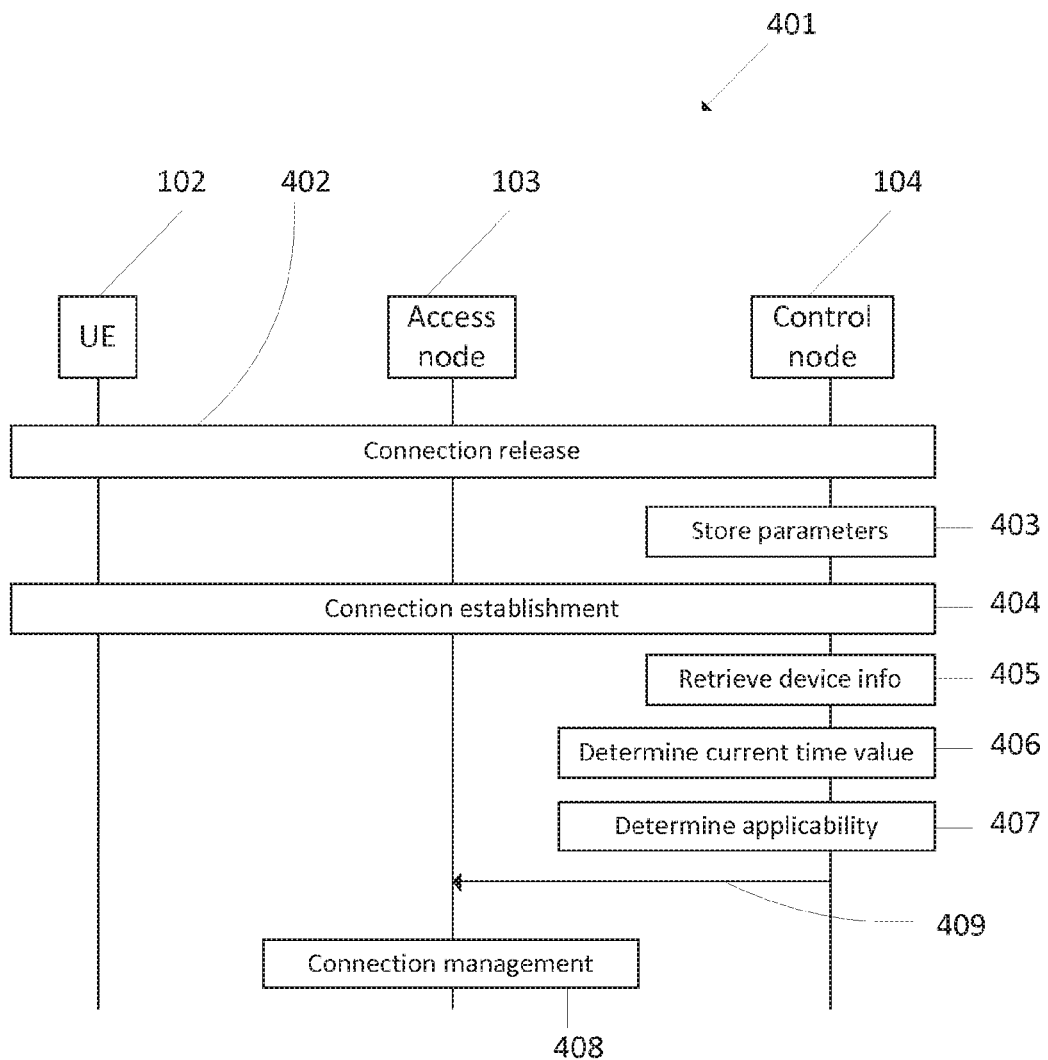
FIG. 4 is a signalling diagram illustrating an exchange of signals in an embodiment of the method.

FIG. 4 is a signalling diagram 401 illustrating an exchange of signals in an embodiment of the method.

The nature of the access node 103, and the mechanisms associated to the storage and retrieval of the connection configuration parameters are different in various embodiments.

In the embodiment shown in FIG. 4, the connection configuration parameters are stored in control node 104 different from the access node 103. The control node 104, is for example a Mobility Management Entity, MME.

Further, the step of determining, based on the time value associated to the available connection configuration parameters related to the prior connection of the UE 102, that the available connection configuration parameters shall be re-used, is performed by the control node 104. This step, however, can also be performed by the access node 103 or by the UE 102 itself, which is explained in more detail with reference to the FIGS. 5-7.

Upon detection that the connection has been released 402 between the UE 102 and the access node 103, for example actively released or lost by an error situation or the like, the connection configuration parameters of the UE 102 are to be stored 403, such that these parameters are made available the next time the same UE 102 intends to connect to the telecommunication network.

Hereto, the access node 103 forwards the connection configuration parameters, along with a unique identity of the UE 102, to a control node 104 comprised in the telecommunication network. The control node is typically an MME arranged for storing connection configuration parameters of a plurality of UE's. The control node 104 then stores the connection configuration parameters, along with the unique identifier of the UE 102, as well as a unique identifier of the serving access node 103, and along with a time value associated with the connection configuration parameters.

The time value is typically a time stamp applied to the connection configuration parameters by the access node 103 which is triggered by the connection release 402, or can be applied to the connection configuration parameters by the control node 104 upon receipt of the connection configuration parameters by the access node 103.

At a later time instant, the UE 102 attempts to establish 404 a connection with the same access node 103, for example via a connection request message. The access node 103 then checks whether connection configuration parameters for that UE 102 are available for re-use, by requesting these parameters at the control node 104. The request is accompanied with the unique identity of the UE 102, for example its IMSI.

Alternatively, the UE 102 attempts to establish 404 a connection to the telecommunication network via a different access node. That different access node then checks whether connection configuration parameters for the UE 102 are available for re-use, for example by requesting these parameters at the control node 104 or at the previous access node 103, i.e. the access node 103 which was previously used for connecting the UE 102 to the telecommunication network.

Based on the received request, the control node 104 retrieves 405 the device information of the UE 102 and its corresponding, yet available, connection configuration parameters. In order to determine the applicability of these parameters, i.e. the re-usability thereof, the control node 104 time stamps 406 the request from the access node 103 accordingly. This time stamp then indicates the moment, i.e. the point in time, when the UE 102 intends to reconnect to the telecommunication network. Then, the time value of the prior connection between the UE 102 and the telecommunication network is retrieved, by the control node 104. The difference between these time values, i.e. the time value related to the prior connection and the time value related to the re-connection of the UE 102 to the telecommunication network, is then used to determine 407 the applicability of the available connection configuration parameters.

For example, in case the time difference between these time values exceeds a predetermined or dynamic threshold value, the control node 104 decides to not re-use the available connection configuration parameters as it is likely that these parameters are no longer valid for the UE 102. In case the time difference between these time values does not exceed the predetermined or dynamic threshold value, the control node 104 decides to re-use the available connection configuration parameters as it is likely that these parameters are still valid for the UE 102.

The above indicated time difference between the time values in fact resembles the time that has passed since the prior connection between the UE 102 and the telecommunication network. Other types of time values may be used for the determination process, i.e. a session time length of the prior connection between the UE 102 and the telecommunication network, or the average session time length of prior connection between the UE 102 and the telecommunication network.

Finally, the control node 104 provides 409 these parameters to the access node 103. A connection management function 408 is then able to set the received connection configuration parameters for the UE 102.

Figure 5:
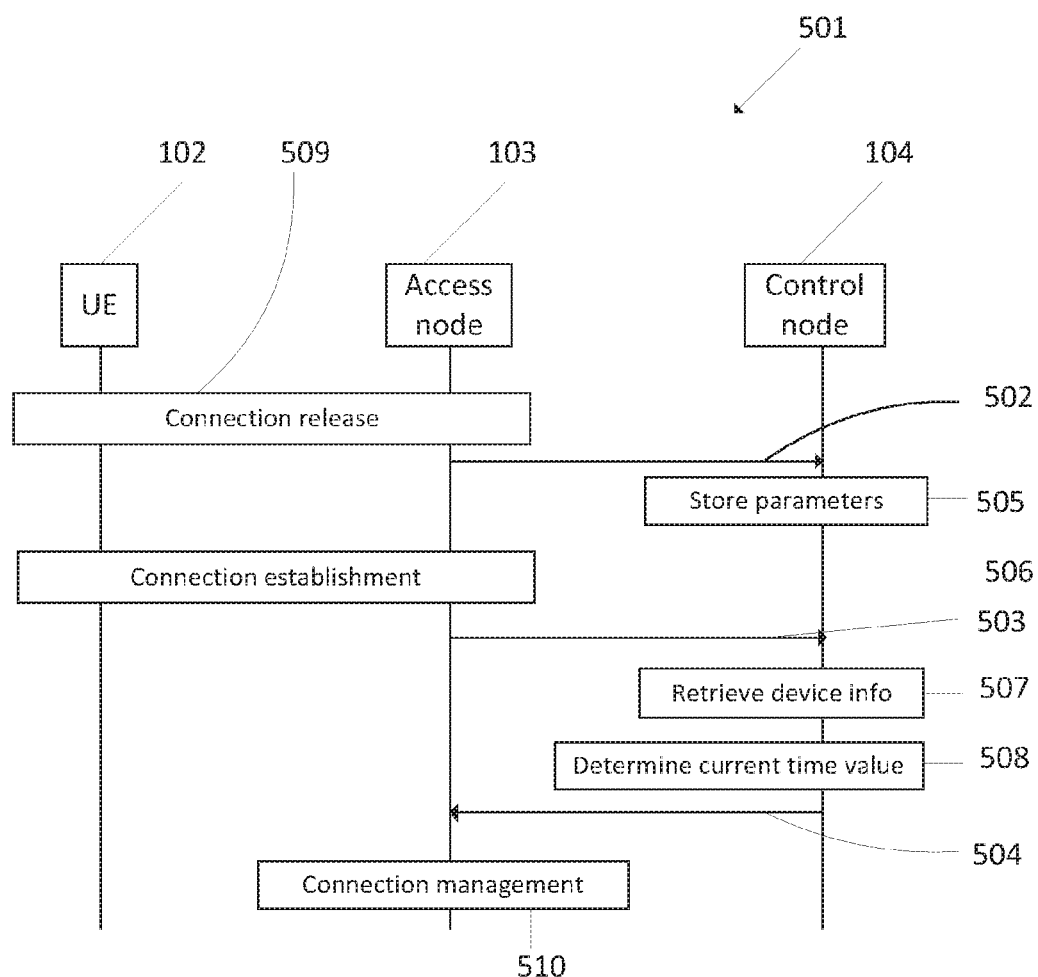
FIG. 5 is a signalling diagram illustrating an exchange of signals in an embodiment of the method.

FIG. 5 is a signalling diagram 01 illustrating an exchange of signals in an embodiment of the method.

The difference with the examples shown in FIG. 5 and FIG. 4 is that in FIG. 5, the step of determining that the available connection configuration parameters shall be re-used is performed by the access node 103 instead of by the control node 104, which is explained in more detail here below.

Upon detection that the connection has been released 509 between the UE 102 and the access node 103, the access node 103 gathers relevant session data. This may comprise device specific information, i.e. comprising the connection configuration parameters, from the access node and/or the UE 102 itself. The access node 103 sends 502 the device-specific information to the control node 104.

The control node 104 then determines a time value for the received device specific information and stores 505 the device specific information along with the determined time value. The association of the device specific information to the UE 102 is made via a device identifier of the UE 102, for example an international Mobile Subscription Identifier, IMSI, or any other type of identifier.

In case the UE 102 intends to reconnect 506 to the telecommunication network, for example via the same access node 103, it will send a connection request message towards the access node 103. Upon receipt of the connection request message, the access node 103 will request 503 the control node 104 for connection configuration parameters as well as a time value related to these connection configuration parameters.

Based on the received request, the control node will retrieve 507 the device specific information for the UE 102, i.e. the available connection configuration parameters as well as the time value related thereto. Then the current time value is determined 508, i.e. a time value indicating the moment, i.e. a time stamp, of the received connection request from the UE 102.

The control node 104 may provide 504 the connection configuration parameters as well as the above identified time values, or the time difference between these time values, to the access node 103.

Based on the time values associated to the prior and the current connection, the access node 103 determines the applicability or impact of the connection configuration parameters. This is then used for connection and device management 510 for the UE 102.

In a preferred example, the applicability of the available connection configuration parameters is based on the above identified time difference between the retrieved time values and a pre-determined time value threshold. In case the time difference is below the time value threshold, then the connection configuration parameters may be considered valid, and are thus be re-used. In case the time difference exceeds the time value threshold, then the connection configuration may be considered outdated, and are thus not be re-used. In the latter case, the connection configuration parameters need to be determined by the access node 103 itself, most likely from scratch.

As mentioned above, the time value threshold may be a static constant which is set once to a pre-determined value. However, the time value threshold may also be a variable which may be amended as time passes by. For example, in case a network node, for example the access node 103 or the control node 104, detects that re-used connection configuration parameters for UE's are often not considered valid, then the network node may recognize that the time value threshold is set too high. As such, the time value threshold may be lowered as to ensure that re-used connection configuration parameters for UE's are more often used validly.

The time value threshold may be maintained, set and provided by any network node in the telecommunication network, for example a Mobility Management Entity, MME, or a Home Subscriber Server, HSS, or the like. This ensures that each of the access nodes 103 in a telecommunication network are provided with a same time value threshold enabling uniformity between the access nodes 103 in a telecommunication network. Alternatively, each of the access nodes 103 are responsible themselves for setting the time value threshold.

In accordance with the present invention, the control node 104 does not need to be involved in the method steps. For example, the step of storing 505 the device specific information along with the determined time value, the step of retrieving 507 the device specific information for the UE 102 and the step of determining 508 the current time value, i.e. a time value indicating the moment, i.e. a time stamp, of the received connection request from the UE 102, may all be performed by the access node 103, such that the involvement of the control node 104 in the method is superfluous. As such, the access node 103 does not need to signal the control node 104 to determine (the applicability of) the available connection configuration parameters of the UE 102.

Figure 6:
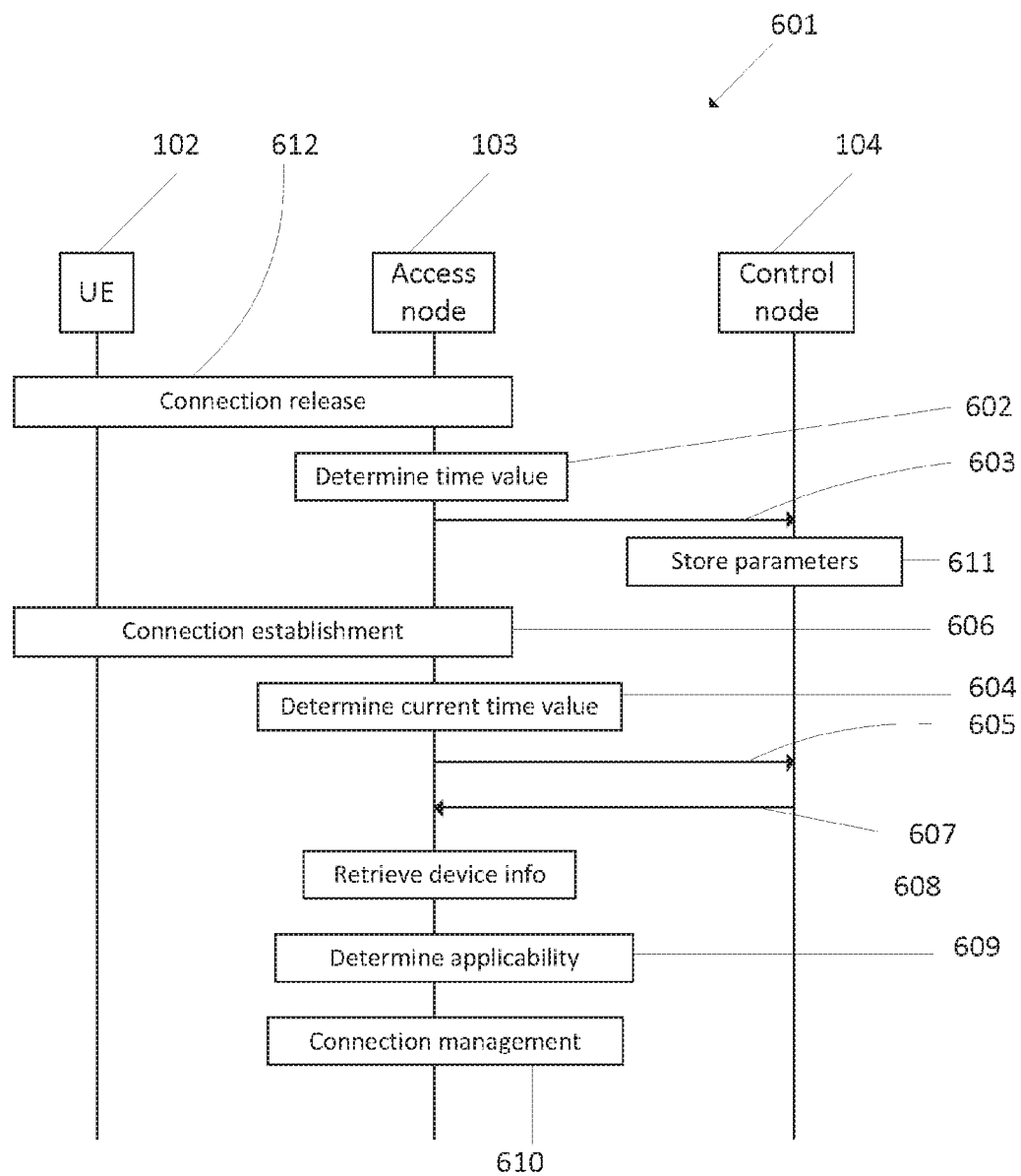
FIG. 6 is a signalling diagram illustrating an exchange of signals in an embodiment of the method.

FIG. 6 is a signalling diagram 601 illustrating an exchange of signals in an embodiment of the method.

In this embodiment, the control node 104 is the node that stores the connection configuration parameters along with the time value associated thereto. The control node 104 is, for example a Mobility Management Entity, MME, a Home Subscriber Server, HSS, or the like.

This example is directed to a network configuration where the true identity of the UE is hidden from the access node 103. This may be a problem in case it is the access node 103 that needs to relate a received connection request from a UE 102 to a prior connection between the UE 102 and the telecommunication network. As such, the access node 103 is not able to determine the time value associated with the prior connection of the UE 102 to the telecommunication network.

This problem is solved by p e shown in FIG. 6, which will be explained in more detail hereafter.

Upon detection that the connection has been released 612 between the UE 102 and the access node 103, the access node 103 time stamps 602 the connection configuration parameters for that connection. The connection configuration parameters as well as the corresponding time stamp are then stored 603 by the access node 103, along with a device identifier of the UE 102.

As the true identity of the UE 102 is to be kept hidden from the access node 103, the device identifier is requested, beforehand, at the control node 104. The true identity of the UE 102 does not need to be hidden from the control node 104 according to present regulations. As such, the control node provides a device identifier, for example a temporary identifier uniquely identifying the UE 102, to the access node 103. The connection configuration parameters of the lose connection between the UE 102 and the telecommunication network are then stored 611, by the access node, along with the time stamp as well as the device identifier received from the control node 104.

Triggered by the connection establishment 606, i.e. a request to reconnect to the telecommunication network, the access node 103 determines the present time value of the request. For example, the access node 103 time stamps 604 a received connection request message from the UE 102.

Then, the control node 104 is requested 605 for the device identifier such that the access node 103 relates the received connection request message from the UE 102 to stored connection configuration parameters for the same UE 102.

Based on the received 607 device identifier, the access node 103 is able to retrieve 608 device specific information comprising the connection configuration parameters for the UE 102. The access node 103 further determines 609, based on the time value associated to the connection configuration parameters related to the prior connection, that the parameters are to be re-used. As such, the connection management 610 will connect the UE 102 to the telecommunication network by setting up those specific configuration parameters for the UE 102.

Figure 7:
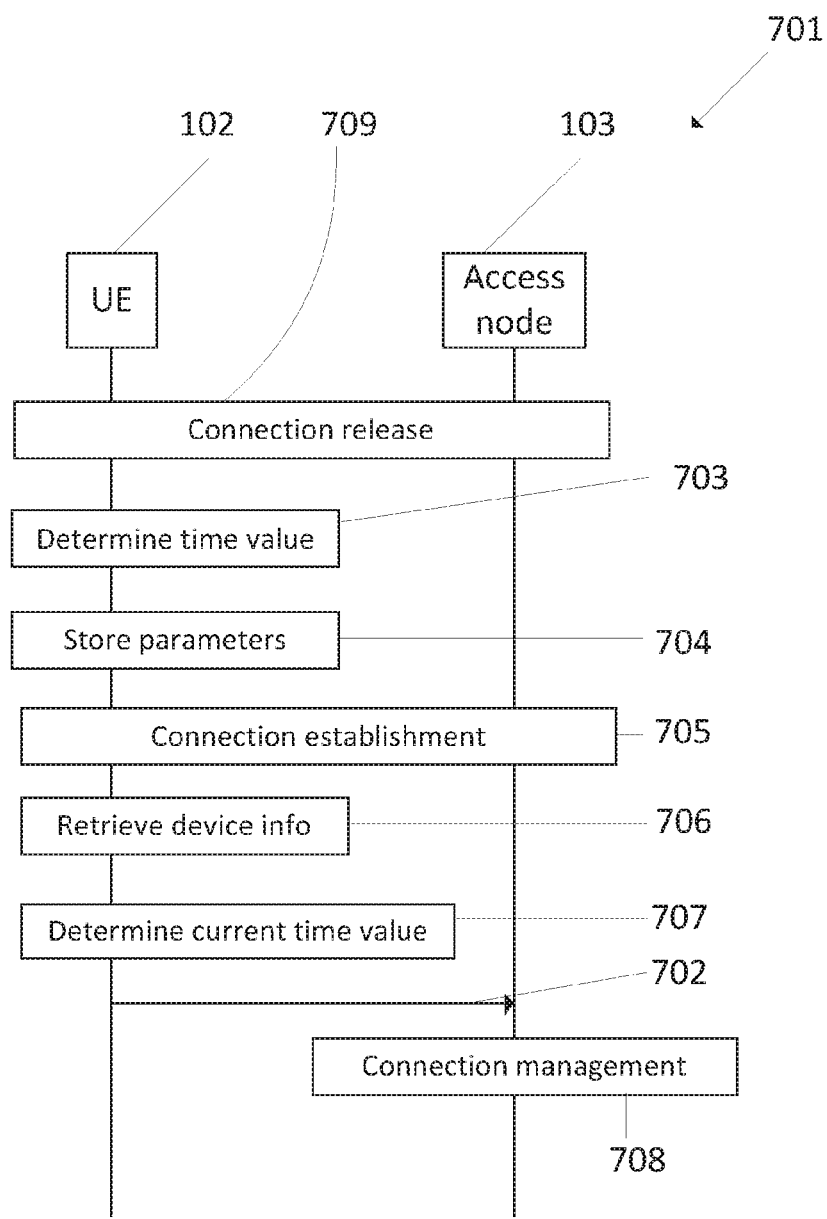
FIG. 7 is a signalling diagram illustrating an exchange of signals in an embodiment of the method.

FIG. 7 is a signalling diagram 701 illustrating an exchange of signals in an embodiment of the method.

Upon detection that the connection has been released 709 between the UE 102 and the access node 103, for example actively released or lost by an error situation or the like, the connection configuration parameters of the UE 102 are to be stored 704, such that these parameters are to be made available the next time the same UE 102 intends to connect to the same telecommunication network.

The key idea in this example is that the connection configuration parameters as well as the corresponding time value is stored at the UE 102 instead of a network node in the telecommunication network.

This means that the steps of determining 703 the time value of the lost connection, as well as the storing 704 of the parameters is performed by the UE 102. Further, upon reconnection 705 of the UE to the telecommunication network, the UE 102 retrieves 706 available connection configuration parameters, and the UE 102 determines 707 the time value of the reconnection process.

The connection configuration parameters as well as the time value(s) may be provided 702 to the access node 103, such that the access node, i.e. the connection management function 708, is able to determine whether the connection configuration parameters are to be re-used.

Figure 8:
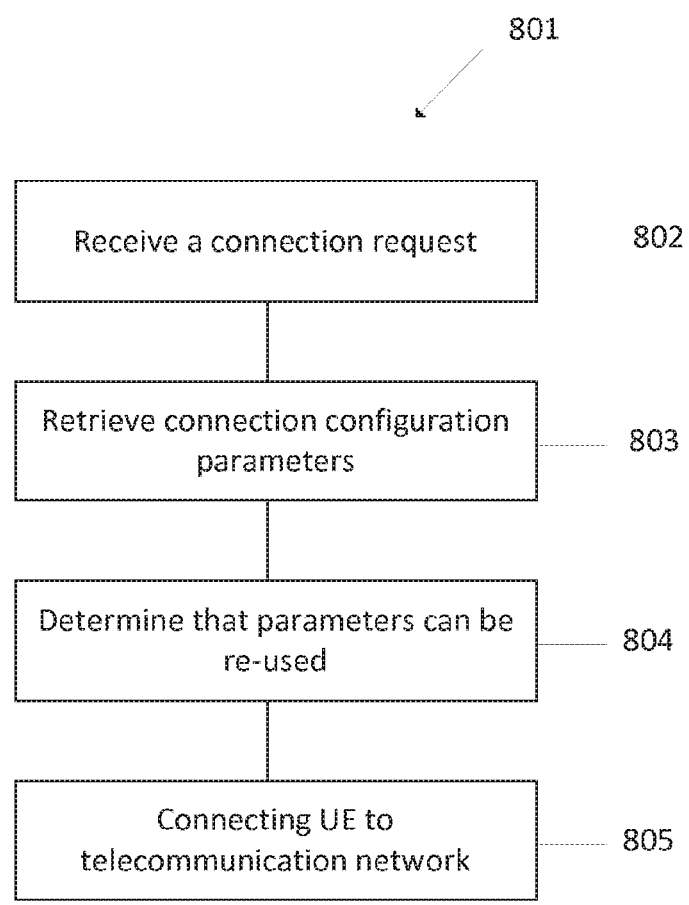
FIG. 8 is a flow chart illustrating an embodiment of method steps.

FIG. 8 is a flow chart 801 illustrating an embodiment of method steps.

The method steps comprise the steps of
  receiving 802, by said access node, a connection request from said UE;
  retrieving 803, by said access node, connection configuration parameters for said UE related to a prior connection between any UE and said telecommunication network;
  determining 804, based on a time value associated to said connection configuration parameters related to said prior connection, that said connection configuration parameters related to said prior connection are to be re-used;
  connecting 805, by said access node, said UE to said telecommunication network via said access node by setting up said connection configuration parameters related to said prior connection, for said UE.

Figure 9:
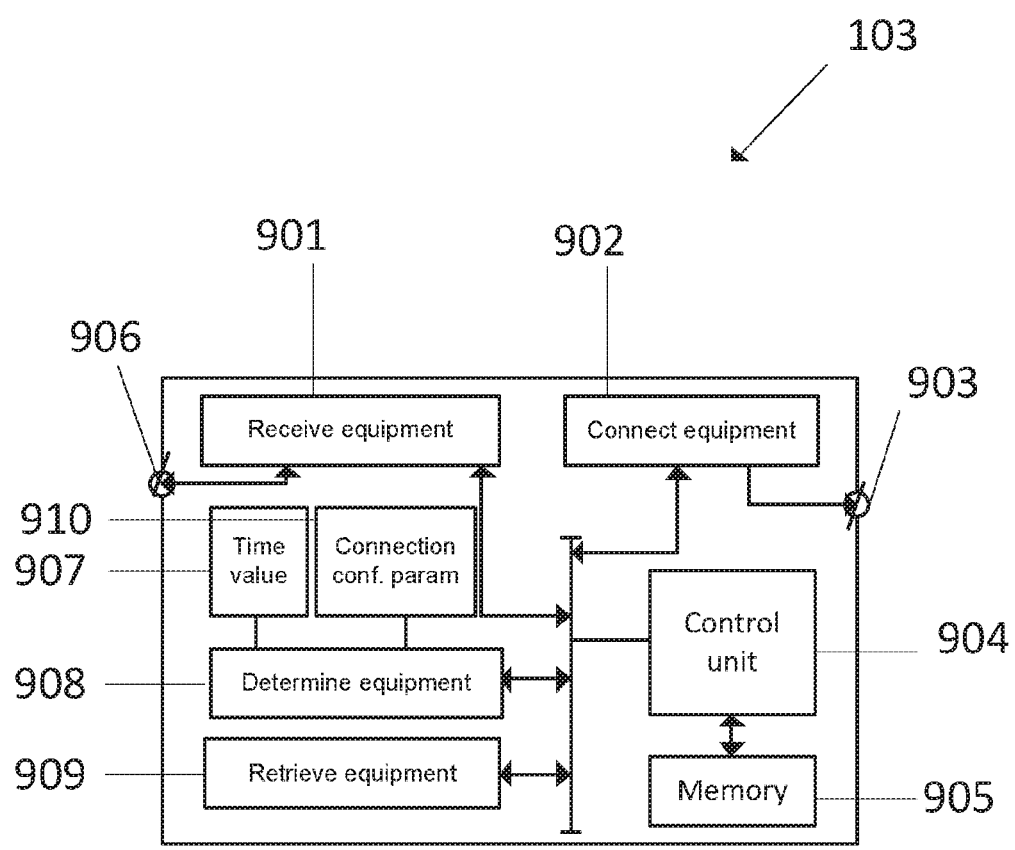
FIG. 9 is a block diagram illustrating an embodiment of an access node.

FIG. 9 is a block diagram illustrating an embodiment of an access node 103 arranged for connecting user equipment, UE, 102 to a telecommunication network, wherein the telecommunication network comprises the access node 103.

The access node 103 comprises a control unit 904 and a memory 905, which control unit 904 is connected to retrieve equipment 909, determine equipment 908, receive equipment 901 and connect equipment 902.

Incoming data packets or messages pass through the input terminal 906 before they reach the receive equipment 901, or a receiving module. Outgoing data packets or messages pass or are sent by the connect equipment 902, or a request module, via the output terminal 903

The receive equipment 901 is arranged for receiving a connection request from a UE. The retrieve equipment 909 is arranged for retrieving connection configuration parameters 910 for the UE related to a prior connection between the UE and the telecommunication network.

The determine equipment 908 is arranged for determining, based on a time value 907 associated to the configuration parameters 910 related to the prior connection, that the configuration parameters related to the prior connection shall be re-used. The connect equipment 902 is arranged for connecting the UE to the telecommunication network by setting up the connection configuration parameters 910 related to the prior connection.

Figure 10:
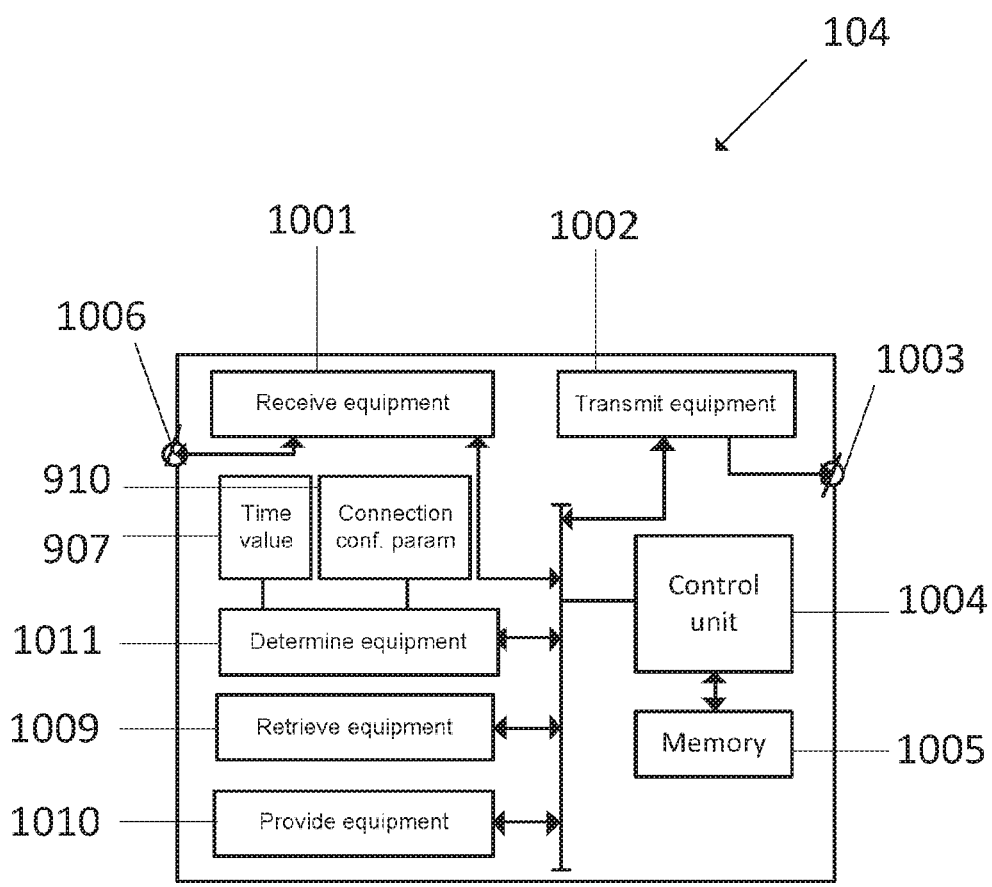
FIG. 10 is a block diagram illustrating an embodiment of a control node.

FIG. 10 is a block diagram illustrating an embodiment of a control node 104 arranged for providing configuration parameters for a connection between a User equipment, UE, 102 and a telecommunication network via an access node 103 comprised in the network.

The control node 104 comprises a control unit 1004 and a memory 1005, which control unit 1004 is connected to transmit equipment 1002, determine equipment 1011, receive equipment 1001, retrieve equipment 1009 and provide equipment 1010.

Incoming data packets or messages pass through the input terminal 1006 before they reach the receive equipment 1001, or a receive module. Outgoing data packets or messages pass or are sent by the transmit equipment 1002, or a transmit module, via the output terminal 1003.

The receive equipment 1001 is arranged for receiving, from an access node 103, a request for configuration parameters for the UE 102. The retrieve equipment 1009 is arranged for retrieving connection configuration parameters 910 for the UE 102 related to a prior connection between the UE 102 and the telecommunication network. The determine equipment 1011 is arranged for determining, based on a time value 907 associated with the configuration parameters 910 related to the prior connection between the UE 102 and the telecommunication network. The provide equipment 1010 is arranged for providing, via the transmit equipment 1002, the configuration parameters related to the prior connection to the access node 103.

Figure 11:
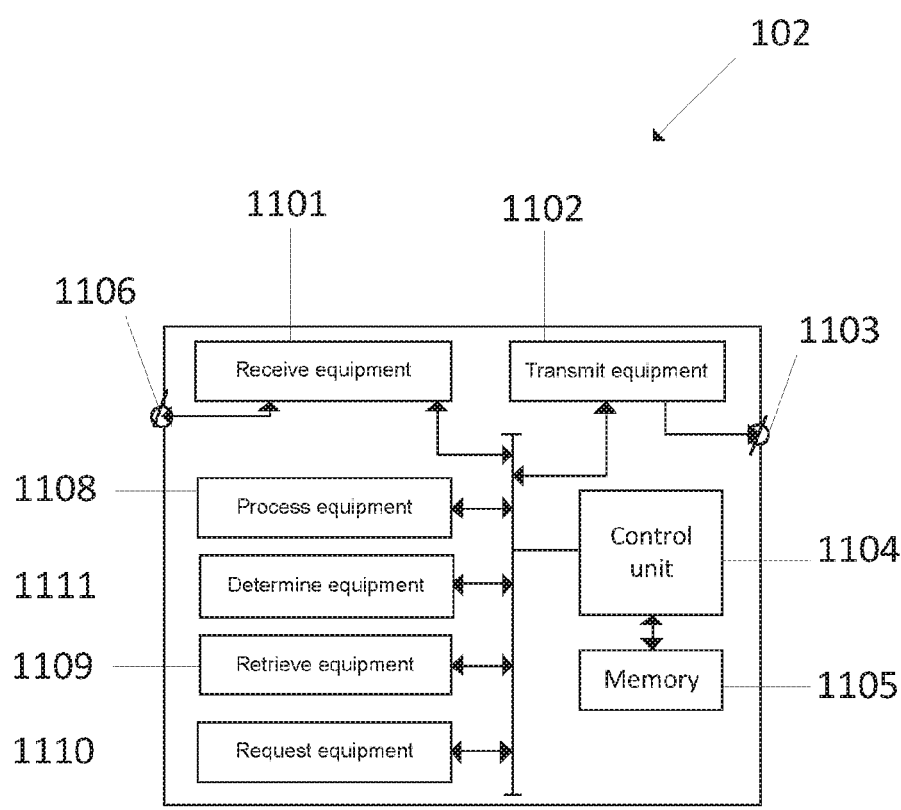
FIG. 11 is a block diagram illustrating an embodiment of a User Equipment.

FIG. 11 is a block diagram illustrating an embodiment of a User Equipment, UE, 102 arranged for requesting a connection to a telecommunication network via an access node 103 comprised in the network.

The UE 102 comprises a control unit 1104 and a memory 1105, which control unit 1104 is connected to transmit equipment 1102, determine equipment 1111, receive equipment 1101, retrieve equipment 1109, process equipment 1108 and request equipment 1110.

Incoming data packets or messages pass through the input terminal 1106 before they reach the receive equipment 1101, or a receive module. Outgoing data packets or messages pass or are sent by the transmit equipment 1102, or a transmit module, via the output terminal 1103.

The retrieve equipment 1109 is arranged for retrieving connection configuration parameters 910 for the UE 102 related to a prior connection between said UE 102 and said telecommunication network. The determine equipment 1111 is arranged for determining, based on a time value associated to said connection configuration parameters 910 related to said prior connection, that said connection configuration parameters 910 related to said prior connection shall be re-used. The process equipment 1108 arranged for setting up said configuration parameters 910 related to said prior connection, for said UE 102. The request equipment 1110 is arranged for requesting said connection to said telecommunication via said access node 103 using said set-up configuration parameters 910.

An advantage of the present invention is that connection configuration parameters are only re-used for a UE in case it is likely that these connection configuration parameters are still valid when the UE re-connects. The connection configuration parameters may be coupled to a time value and a device identifier in order to be able to determine the time between subsequent connections of the same UE.

As such, by associating the connection configuration parameters to a time value, it is possible to determine whether available connection configuration parameters related to a prior connection are relevant, or to what extent the connection configuration parameters shall be considered for the UE requesting a connection. Thereby, the prior connection configuration parameters will be considered in an adequate manner without risking to exploit outdated connection configuration parameters.

In order to obtain the advantages of the method, it is sufficient when at least one available connection configuration parameter is re-used, or when the connection configuration parameters for the UE are determined using the available connection configuration parameters as an input for the determination process. In the latter, using the available connection configuration parameters in the determination process ensure that the determination process quickly converges to a UE specific configuration.

Following the above, by re-using still available connection configuration parameters for the UE, the initial UE configuration is made UE specific which means that a UE specific configuration is adopted much faster compared to using a general purpose initial configuration.

Another advantage of the present application is directed to a specific example in which the true identity of the UE is to be kept hidden from the access node. In case the control node provides a device identifier to the access node, the access node is still able to relate a connection request from a UE to a prior connection from that same UE. As such, the access node is still not aware of the true identity of the UE, but is able to relate subsequent connections from the same UE to the telecommunication network.

Following the above, the advantage becomes clear, for example in the following situations. If the difference between the end time of the previous connection and the current session start time is below a certain time value threshold then the secondary cells from the previous connection are re-used, meaning that they are configured immediately, without cumbersome UE measurements etc, when the UE connects. If previous connection data show that UE activity varies significantly, then the secondary cells related to the previous connection are configured immediately even though the average session length is relatively short. This way, secondary cell resources are allocated much faster to the UE when its traffic behaviour intensifies and the resources are needed. This particular example focuses on carrier aggregation but the present invention is not limited to that.

The present invention is not limited to the embodiments as disclosed above, and can be modified and enhanced by those skilled in the art beyond the scope of the present invention as disclosed in the appended claims without having to apply inventive skills.

The invention claimed is:

1. A method of connecting User Equipment (UEs) to a telecommunication network via an access node of the telecommunication network, the method comprising:
    upon detection of a released connection between a first UE and the telecommunication network, storing configuration parameters related to the released connection;
    subsequently receiving a request for a further connection from a requesting UE, wherein the requesting UE is the first UE or a second UE; and
    based on a time value associated with the released connection, determining whether the stored configuration parameters related to the released connection can be re-used in relation to the request for the further connection.

2. The method of claim 1, wherein the second UE is in the same geographical area as the first UE.

3. The method of claim 1, further comprising, based on determining that the stored configuration parameters related to the released connection can be re-used, establishing the further connection between the requesting UE and the telecommunication network based on the stored configuration parameters.

4. The method of claim 1, wherein determining whether the stored connection configuration parameters related to the released connection can be re-used comprises:
    determining a difference between the time value and a further time value associated with the request for the further connection; and
    based on the difference being less than or equal to a threshold, determining that the stored configuration parameters related to the released connection can be re-used in relation to the request for the further connection.

5. The method of claim 1, wherein the configuration parameters include any of the following:
    configuration of frequency carrier aggregation via licensed and unlicensed frequency bands;
    dual connectivity configuration;
    antenna beam configuration;
    uplink timing configuration;
    history of need for and utilization of secondary carriers;
    geographical information;
    aggregated frequency bands;
    aggregated bandwidth; and
    measurement and feedback configuration.

6. The method of claim 1, wherein the method is performed by the access node.

7. The method of claim 6, further comprising:
    determining the time value associated with the released connection; and
    storing, at the access node, the time value in association with the configuration parameters.

8. The method of claim 6, wherein:
    the configuration parameters related to the released connection are stored in association with a device identifier of the UE; and
    determining whether the stored configuration parameters related to the released connection can be re-used comprises:
        receiving the device identifier from a control node in the telecommunication network; and
        determining the time value associated with the released connection based on the received device identifier.

9. The method of claim 6, wherein:
    storing the configuration parameters related to the released connection comprises sending the configuration parameters to a control node of the telecommunication network for storage; and
    determining whether the stored configuration parameters related to the released connection can be re-used comprises retrieving the configuration parameters from the control node.

10. The method of claim 9, further comprising receiving the time value from the control node in association with the retrieved configuration parameters.

11. The method of claim 1, wherein the method is performed by a control node of the telecommunication network.

12. A network node arranged for connecting User Equipment (UE) to a telecommunication network via an access node of the telecommunication network, the network node comprising:
   at least one processor; and
   at least one memory storing executable instructions that, when executed by the at least one processor, configure the network node to:
      upon detection of a released connection between a first UE and the telecommunication network, storing configuration parameters related to the released connection;
      subsequently receive a request for a further connection from a requesting UE, wherein the requesting UE is the first UE or a second UE; and
      based on a time value associated with the released connection, determine whether the stored configuration parameters related to the released connection can be re-used in relation to the request for the further connection.

13. The network node of claim 12, wherein the second UE is in the same geographical area as the first UE.

14. The network node of claim 12, wherein execution of the instructions further configures the network node to, based on determining that the stored configuration parameters related to the released connection can be re-used, establish the further connection between the requesting UE and the telecommunication network based on the stored configuration parameters.

15. The network node of claim 12, wherein execution of the instructions configures the network node to determine whether the stored connection configuration parameters related to the released connection can be re-used based on:
   determining a difference between the time value and a further time value associated with the request for the further connection; and
   based on the difference being less than or equal to a threshold, determining that the stored configuration parameters related to the released connection can be re-used in relation to the request for the further connection.

16. The network node of claim 12, wherein the configuration parameters include any of the following:
   configuration of frequency carrier aggregation via licensed and unlicensed frequency bands;
   dual connectivity configuration;
   antenna beam configuration;
   uplink timing configuration;
   history of need for and utilization of secondary carriers;
   geographical information;
   aggregated frequency bands;
   aggregated bandwidth; and
   measurement and feedback configuration.

17. The network node of claim 12, wherein the network node is the access node.

18. The network node of claim 17, wherein execution of the instructions further configures the network node to:
   determine the time value associated with the released connection; and
   store, at the access node, the time value in association with the configuration parameters.

19. The network node of claim 17, wherein:
   the configuration parameters related to the released connection are stored in association with a device identifier of the UE; and
   execution of the instructions configures the network node to determine whether the stored configuration parameters related to the released connection can be re-used based on:
      receiving the device identifier from a control node in the telecommunication network; and
      determining the time value associated with the released connection based on the received device identifier.

20. The network node of claim 17, wherein execution of the instructions configures the network node to:
   store the configuration parameters related to the released connection based on sending the configuration parameters to a control node of the telecommunication network for storage; and
   determine whether the stored configuration parameters related to the released connection can be re-used based on retrieving the configuration parameters from the control node.

21. The network node of claim 20, execution of the instructions further configures the network node to receive the time value from the control node in association with the retrieved configuration parameters.

22. The network node of claim 12, wherein the network node is a control node of the telecommunication network.

* * * * *